United States Patent
Hung

(10) Patent No.: US 7,619,862 B2
(45) Date of Patent: Nov. 17, 2009

(54) ELECTROSTATIC DISCHARGE PROTECTION CIRCUIT FOR HIGH VOLTAGE INPUT PAD

(75) Inventor: Kenneth Wai Ming Hung, Hong Kong (HK)

(73) Assignee: Smartech Worldwide Limited, Hong Kong (CN)

( * ) Notice: Subject to any disclaimer, the term of this patent is extended or adjusted under 35 U.S.C. 154(b) by 528 days.

(21) Appl. No.: 11/678,045

(22) Filed: Feb. 22, 2007

(65) Prior Publication Data

US 2008/0204952 A1    Aug. 28, 2008

(51) Int. Cl.
*H02H 3/20* (2006.01)
*H02H 9/00* (2006.01)

(52) U.S. Cl. .................. 361/56; 361/111; 361/91.1

(58) Field of Classification Search .................. 361/56, 361/111, 91.1
See application file for complete search history.

(56) References Cited

U.S. PATENT DOCUMENTS

| | | | |
|---|---|---|---|
| 4,990,802 A | 2/1991 | Smooha | |
| 5,157,573 A | 10/1992 | Lee | |
| 5,345,357 A | 9/1994 | Pianka | |
| 5,463,520 A | 10/1995 | Nelson | |
| 5,559,659 A | 9/1996 | Strauss | |
| 5,608,595 A * | 3/1997 | Gourab et al. ............... | 361/79 |
| 5,617,283 A | 4/1997 | Krakauer | |
| 5,629,544 A * | 5/1997 | Voldman et al. ............ | 257/355 |
| 5,729,419 A | 3/1998 | Lien | |
| 5,745,323 A | 4/1998 | English | |
| 5,754,381 A | 5/1998 | Ker | |
| 5,780,897 A | 7/1998 | Krakauer | |
| 5,825,601 A | 10/1998 | Statz | |
| 5,946,177 A * | 8/1999 | Miller et al. ............... | 361/56 |
| 5,978,192 A | 11/1999 | Young | |
| 6,043,967 A | 3/2000 | Lin | |
| 6,069,782 A * | 5/2000 | Lien et al. .................. | 361/111 |
| 6,091,593 A | 7/2000 | Lin | |
| 6,522,511 B1 | 2/2003 | John | |
| 6,529,359 B1 | 3/2003 | Verhaege | |
| 6,538,868 B2 | 3/2003 | Chang | |
| 6,657,835 B2 * | 12/2003 | Ker et al. .................... | 361/56 |
| 6,661,273 B1 * | 12/2003 | Lai et al. .................... | 327/310 |
| 6,690,561 B2 | 2/2004 | Hung | |
| 6,704,179 B2 * | 3/2004 | Voldman ..................... | 361/56 |
| 6,724,603 B2 * | 4/2004 | Miller et al. ................ | 361/111 |
| 6,919,602 B2 | 7/2005 | Lin | |
| 7,067,884 B2 * | 6/2006 | Okushima ................... | 257/355 |
| 7,242,561 B2 * | 7/2007 | Ker et al. .................... | 361/56 |

* cited by examiner

*Primary Examiner*—Stephen W Jackson
*Assistant Examiner*—Zeev Kitov
(74) *Attorney, Agent, or Firm*—Xin Wen

(57) ABSTRACT

An electrostatic discharge protection circuit includes a high-voltage supply terminal (VDD), an input/output (IO) pad, and a first shunting transistor that can discharge electrostatic charges between the IO pad and VDD in response to a control signal. A trigger circuit can output the control signal in response to an electrostatic voltage between the IO pad and VDD. The electrostatic discharge protection circuit also includes a first group of serially connected diodes, which includes a first end connected to the IO pad and a second end configured to supply power to the trigger circuit.

20 Claims, 4 Drawing Sheets

US 7,619,862 B2

ELECTROSTATIC DISCHARGE PROTECTION CIRCUIT FOR HIGH VOLTAGE INPUT PAD

BACKGROUND

The present disclosure relates to an electrostatic discharge (ESD) protection circuit, in particular, to an ESD protection circuit for a high voltage input pad.

Electrostatic discharge is an event that can occur during device fabrication, assembly packaging, or device handling. During a typical ESD event, a large amount of charges can accumulate in a bonding pad of an integrated circuit. If the charges produce a high voltage that a chip cannot tolerate, a fatal discharge may happen inside the chip to cause the chip malfunction. It is therefore important for semiconductor chips to have protection mechanisms against ESD events.

In the past, nominal operating voltage was usually 5 volts for semiconductor chips and for electronic devices using the semiconductor chips. Due to the advances in semiconductor processing technologies, nowadays the operating voltages for the semiconductor chips are commonly at 1.8 volts or even as low as 1.0 volt. The breakdown voltages for gate-to-drain, gate-to-source, and drain-to-source in transistors have all come down rapidly in recent years. The maximum transistor operation voltage for transistors is about 6.0-6.5 volt for 0.35 micron semiconductor fabrication and 4.0-4.5 volt for 0.18 micron semiconductor fabrication. However, these voltages can only operate in a short time and prolonged operation will reduce transistor's reliability. Therefore, operating voltage range for typical 0.35 um is 2.7V-3.6V and 1.6V-2.0V for 0.18 um. Transistors' breakdown voltages are likely to continue to trend downwards in the foreseeable future.

Electronic devices that use semiconductor chips, on the other hand, have not kept up with the pace of advancement by the semiconductor processing technologies. Nominal operating voltages for most electronic devices are still in the range of 3.3 volts and 5.0 volts. The gap between the nominal operating voltages for semiconductor chips and electronic devices require that the semiconductor chips to handle high-voltage inputs to the chips from the rest of the electronic devices.

FIG. 1 disclosed a conventional ESD protection circuit 10 that includes NMOS (i.e. N-MOSFET) transistors 101 and 102 connected in a cascoded or series configuration. The gate of the transistor 101 connected to a high-voltage supply terminal (VDD). The gate of transistor 102 is connected to its source to form a diode-connected transistor. The source of the transistor 102 is connected to a low-voltage supply terminal (VSS).

The ESD protection circuit 10 can protect the circuit 105 from high voltage input as the input/output (IO) pad 100. Assuming the ESD protection circuit 10 is fabricated using 0.35 micron semiconductor fabrication technologies, the maximum transistor operation voltage for the transistors is about 6.0V. VDD is typically at 3.3V. The drain of the NMOS transistor 101 is connected with an IO pad 100 that can receive a high voltage inputs from the rest of the electronic device. For example, for a one-time-program (OTP) device, the memory programming voltage is at about 6.5V. The drain-to-gate voltage ($V_{DS}$) is thus 6.5V −3.3V=3.2V. The source voltage is VDD−$V_{TN}$ (assuming $V_{TN}$=1.0V)=2.3V, wherein $V_{TN}$ is the turn-on threshold voltage for a NMOS transistor. The drain-to-source voltage for the transistor 101 is 6.5V− 2.3V=4.2V. The voltage differences between the three terminals of the transistor 101 are therefore all below the maximum transistor operation voltage of 6.0V for transistors using 0.35 micron semiconductor fabrication technologies.

A major drawback exists, however, in the ESD protection circuit 10. During ESD event zapping from the IO pad 100 to VSS (i.e., VSS connects to ground), the gate voltage for the transistor 101 is undefined, which can affect the current shunting performance of both transistors 101 and 102. During ESD event zapping from the IO pad 100 to VDD (i.e., VDD connects to ground), the gate of transistor 101 is shorted to the ground. No current shunting can occur in the drain-to-source current path. As a result, the ESD protection circuit 10 can only protect the circuit 105 from high voltage input at the IO pad 100 but cannot provide proper protection against ESD events.

Another conventional ESD protection circuit 20, referring to FIG. 2, includes an improvement over the ESD protection circuit 10. A parasitic diode 120 added between the IO pad 100 and VDD can improve current discharging for an ESD event that zaps from IO pad to VDD. The ESD protection circuit 20, however, cannot properly handle high voltage input at the IO pad 100. When an input signal at 6.5V is applied to the IO pad 100, current leakage can occur from the IO pad 100 to VDD if the voltage between the IO pad 100 and the VDD is higher than the diode bias voltage that is normally around 1.0 V. For a typical 0.35 micron semiconductor fabrication process, VDD is nominally set to 3.3V. A direct current path can therefore be formed between the IO pad 100 and VDD in the presence of a high voltage input at the IO pad 100. There is therefore a need for an ESD protection circuit that can protect circuits in semiconductor chips from high input voltages during normal operations as well as from ESD events. An ESD protection circuit is desirably built with common CMOS components.

SUMMARY

In a general aspect, the present invention relates to an electrostatic discharge protection circuit including a high-voltage supply terminal (VDD); an input/output (IO) pad; a first shunting transistor configured to discharge electrostatic charges between the IO pad and VDD in response to a control signal; a trigger circuit configured to output the control signal in response to an electrostatic voltage between the IO pad and VDD; and a first group of serially connected diodes, which includes a first end connected to the IO pad and a second end configured to supply power to the trigger circuit.

In another general aspect, the present invention relates to an electrostatic discharge protection circuit including a high-voltage supply terminal (VDD); an input/output (IO) pad; a first shunting transistor configured to discharge electrostatic charges between the IO pad and VDD in response to a control signal received by the gate of the first shunting transistor; a trigger circuit configured to output the control signal in response to an electrostatic voltage between the IO pad and VDD; a first group of serially connected diodes, which includes a first end connected to the IO pad and a second end configured to supply power to the trigger circuit; a second shunting transistor and a third shunting transistor connected in cascoded configuration between the IO pad and a low-voltage supply terminal (VSS), wherein a gate of the fourth shunting transistor is connected to the control signal output by the trigger circuit; and a second group of serially connected diodes, which includes a first end connected to the IO pad and a second end configured to gate of the third shunting transistor.

In yet another general aspect, the present invention relates to an electrostatic discharge protection circuit including a high-voltage supply terminal (VDD); an input/output (IO) pad; a first shunting transistor and a second shunting transistor connected in cascoded configuration between the IO pad and VDD, wherein the first shunting transistor and the second shunting transistor are configured to discharge electrostatic charges between the IO pad and VDD in response to a control signal received by the gate of the first shunting transistor; a trigger circuit configured to output the control signal in response to an electrostatic voltage between the IO pad and VDD; a first group of serially connected diodes, which includes a first end connected to the IO pad and a second end configured to supply power to the trigger circuit, wherein the second end of the first group of serially connected diodes is connected to the gate of the second shunting transistor; a third shunting transistor and a fourth shunting transistor connected in cascoded configuration between the IO pad and a low-voltage supply terminal (VSS), wherein a gate of the fourth shunting transistor is connected to the control signal output by the trigger circuit; and a second group of serially connected diodes, which includes a first end connected to the IO pad and a second end configured to gate of the third shunting transistor.

Implementations of the system may include one or more of the following. The gate of the first shunting transistor can receive the first control signal. The first shunting transistor can be turned on to discharge electrostatic charges between the IO pad and VDD when the first control signal has a high logic voltage and the first shunting transistor is turned off when the first control signal has at a low logic voltage. The trigger circuit can output the control signal at a high logic voltage in response to an electrostatic voltage between the IO pad and VDD. The electrostatic discharge protection circuit can, further include a second shunting transistor connected between the IO pad and the first shunting transistor, wherein the gate of the second shunting transistor is connected to the second end of the first group of serially connected diodes. At least one in the first group of serially connected diodes can be a transistor-connected diode. The first shunting transistor and the transistor-connected diode can be N-MOSFET transistors. The electrostatic discharge protection circuit can further include a third shunting transistor and a fourth shunting transistor connected in cascoded fashion between the IO pad and a low-voltage supply terminal (VSS), wherein a gate of the fourth shunting transistor is connected to the control signal output by the trigger circuit; and a second group of serially connected diodes, which includes a first end connected to the IO pad and a second end configured to gate of the third shunting transistor. The electrostatic discharge protection circuit can further include a resistor connecting the gate of the fourth shunting transistor and VSS. The trigger circuit can include a first inverter, a first feedback transistor having a gate connected with the output of the first inverter and a drain connected with the input of the first inverter; and a second feedback transistor having a gate connected with the output of the first inverter and a source connected with the input of the first inverter. The electrostatic discharge protection circuit can further include a resistor and a capacitor that are connected to an input to the first inverter. At least one of the resistor and the capacitor is connected with the voltage supply terminal.

Embodiments may include one or more of the following advantages. The disclosed high-voltage protection circuit can withstand high input voltages above VDD. The maximum operation voltage for transistors is determined by the semiconductor technologies used to fabricate the transistors (for example, the maximum operation voltage is about 6.0-6.5 volt for 0.35 micron semiconductor technologies). The disclosed ESD protection circuit allows an (internal) circuit and the disclosed ESD protection circuit itself to withstand input voltages above the maximum operation voltage for transistors.

The disclosed ESD protection circuit can also protect an (internal) circuit from ESD events. The disclosed ESD protection circuit can protect a circuit from ESD zapping in different directions such as from an IO pad to VDD, from an IO pad to VSS, or from VDD to VSS.

Moreover, the disclosed ESD protection circuit can be implemented in smaller area, can be simpler to design, and can respond to high voltages more quickly than conventional ESD protection circuits. Furthermore, the disclosed ESD protection circuit can also prevent the formation of a direct DC current path from an IO pad to VDD, a known problem in some conventional ESD protection circuit.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

DETAILED DESCRIPTION

Figure 1:
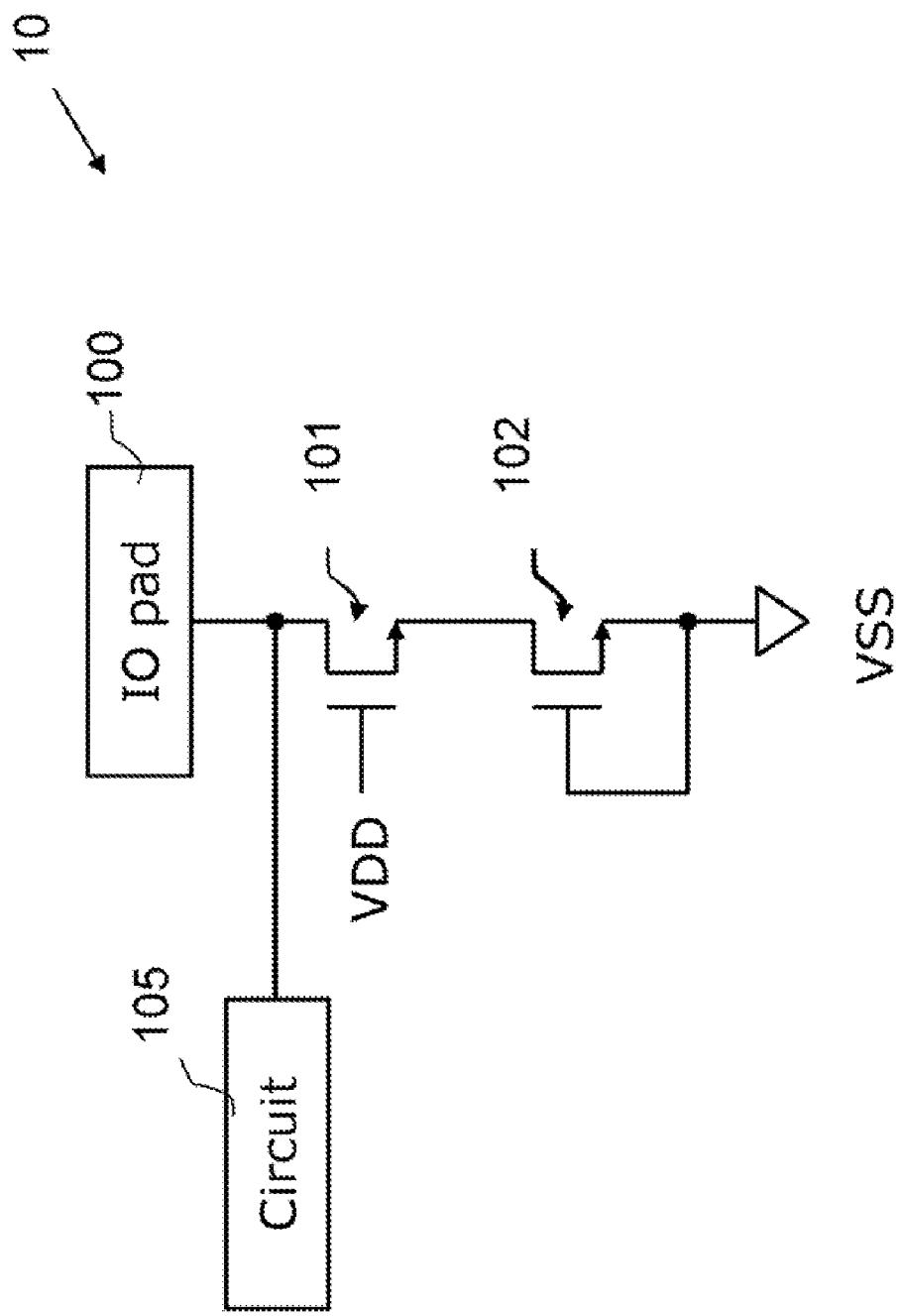
FIG. 1 is a schematic circuit diagram of a conventional ESD protection circuit.
Figure 2:
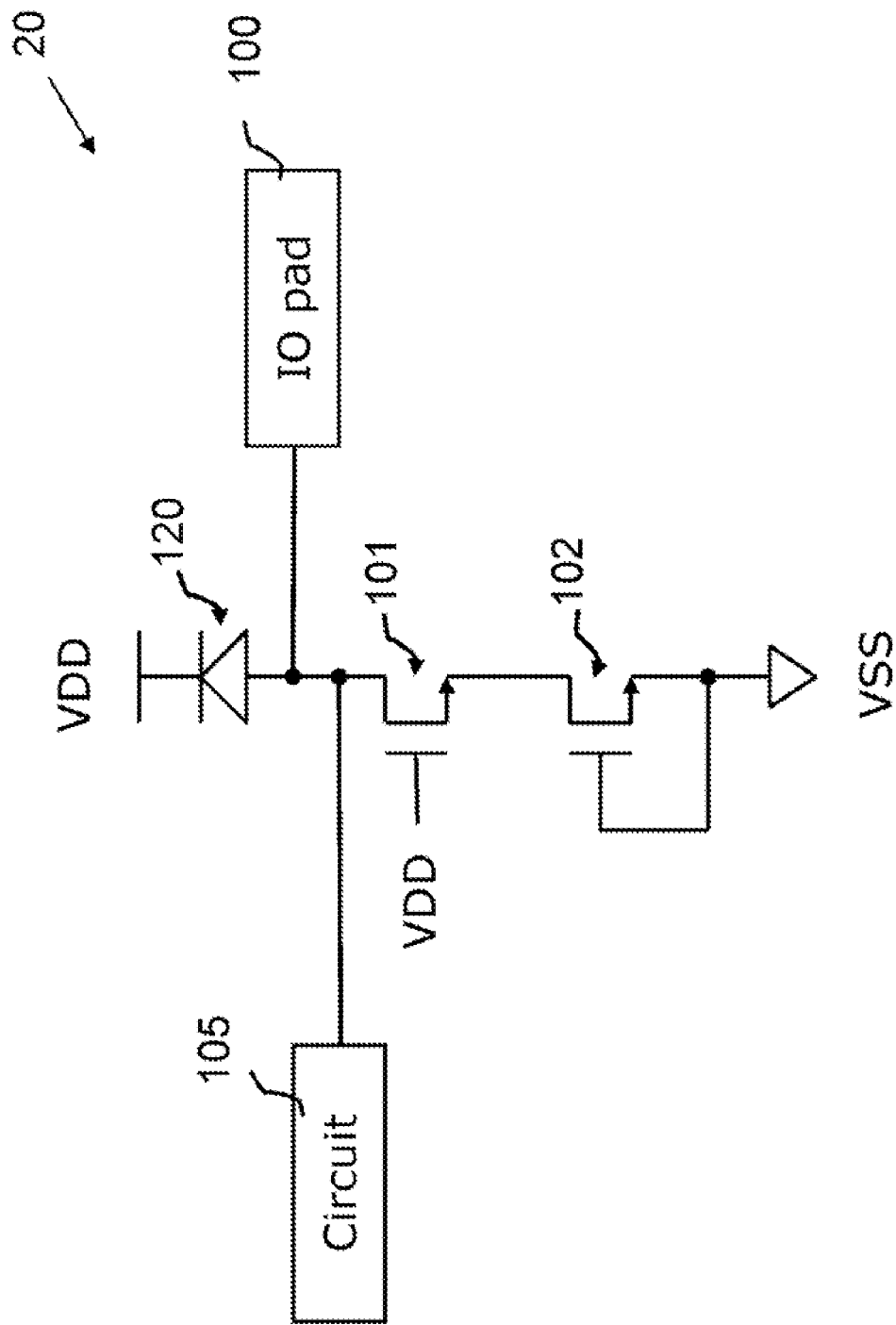
FIG. 2 is a schematic circuit diagram of another conventional ESD protection circuit.
Figure 3:
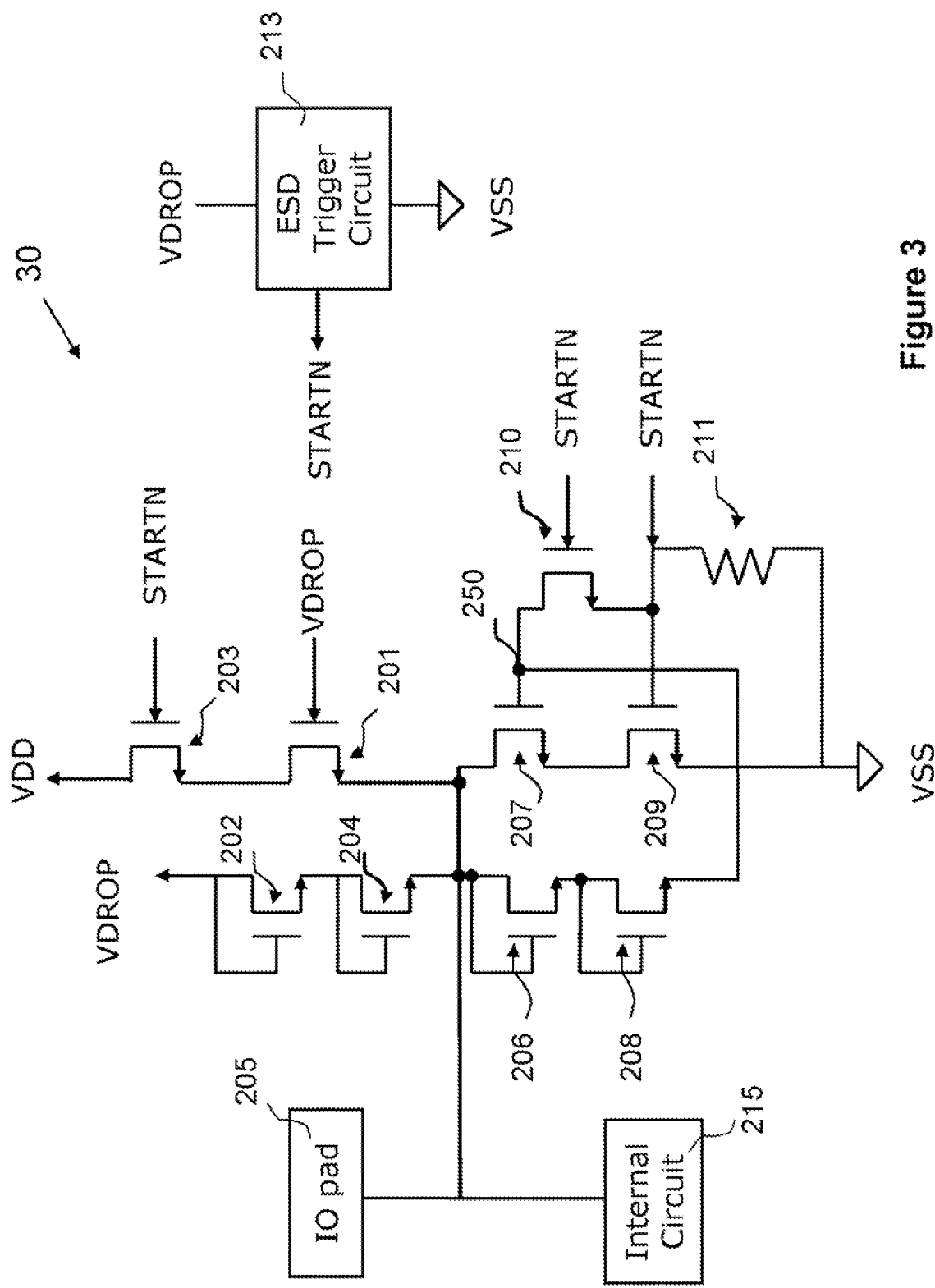
FIG. 3 is a schematic diagram of an ESD protection circuit for a high voltage input pad in accordance with the present specification.

Referring to FIGS. 3A and 3B, an ESD protection circuit 30 includes NMOS transistors 202-204, an IO pad 205, an internal circuit 215, and an ESD trigger circuit 213. The IO pad 205 can receive external high-voltage signals that have voltages higher than VDD. As described above, the high-voltage signals can be input to the internal circuit 215 from other parts of an electronic device that includes the internal circuit 215 and the ESD protection circuit 30. The NMOS transistors 202 and 204 are connected in cascoded configuration. The gates of the transistors 202 and 204 are respectively connected to their sources to form transistor-connected diodes. The drain of the NMOS transistor 204 is coupled to the IO pad 205 and the internal circuit 215. When a high-voltage signal is received at the IO pad 205, the source of transistor 202 can output a voltage VDROP that is lower than the voltage of the IO pad 205 by a predetermined voltage. The voltage between VDROP and the IO pad 205 is the sum of the diode threshold voltages (or $2V_{TN}$) in the transistors 202 and 204 that are connected as diodes in the implementation shown in FIG. 3).

The ESD protection circuit 30 includes current shunting transistors 201 and 203 that can shunt ESD current between the IO pad 205 and VDD. The gate of the shunting transistor 203 can receive a control signal STARTN from the ESD trigger circuit 213 that can turn on or off of the shunting operation of the shunting transistor 203. The source of the NMOS transistor 203 is coupled to VDD. The drain of the NMOS transistor 203 is coupled to the source of the transistors 201. The source of the NMOS transistor 201 is coupled to the IO pad 205. The gate of the transistor 201 is coupled to VDROP.

The ESD protection circuit 30 also includes ESD current shunting transistors 207 and 209 that can shunt ESD current between the IO pad 205 and VSS, NMOS transistors 206, 208, and a resistor 211. The gates of transistors 209 and 210 are coupled to the control signal STARTN from the ESD trigger circuit 213. The transistors 209 and 210 are thus both controlled by the ESD trigger circuit 213. The transistors 206 and 208 are connected in cascoded configuration. The gates of the transistors 206 and 208 are respectively connected to their drains to form transistor-connected diodes. The source of the transistor 208 is coupled to the gate of transistor 207. The transistor 210 is an ESD trigger transistor that can provide active turn-on during an ESD event. The resistor 211 connects the gate of the transistor 209 to VSS, which can hold the gate of the transistor 209 low during normal operation and prevent accidental turn-on and current leakage.

The layout and properties of the internal circuit 215 depend on the applications. For example, the internal circuit 215 can be an one-time-programming (OTP) memory. The memory can have many OTP Fuse cells are initialized by ultraviolet light illumination and programmed by the injection of hot electrons generated by avalanche impact ionization. A 6.5V programming voltage can be supplied from an IO pad or from the internal charge pumping circuit to initiate the hot electron injection for programming. In normal operations, the internal circuit 215 can receive input voltage at the IO pad 205 at voltages at or higher than VDD.

Figure 4:
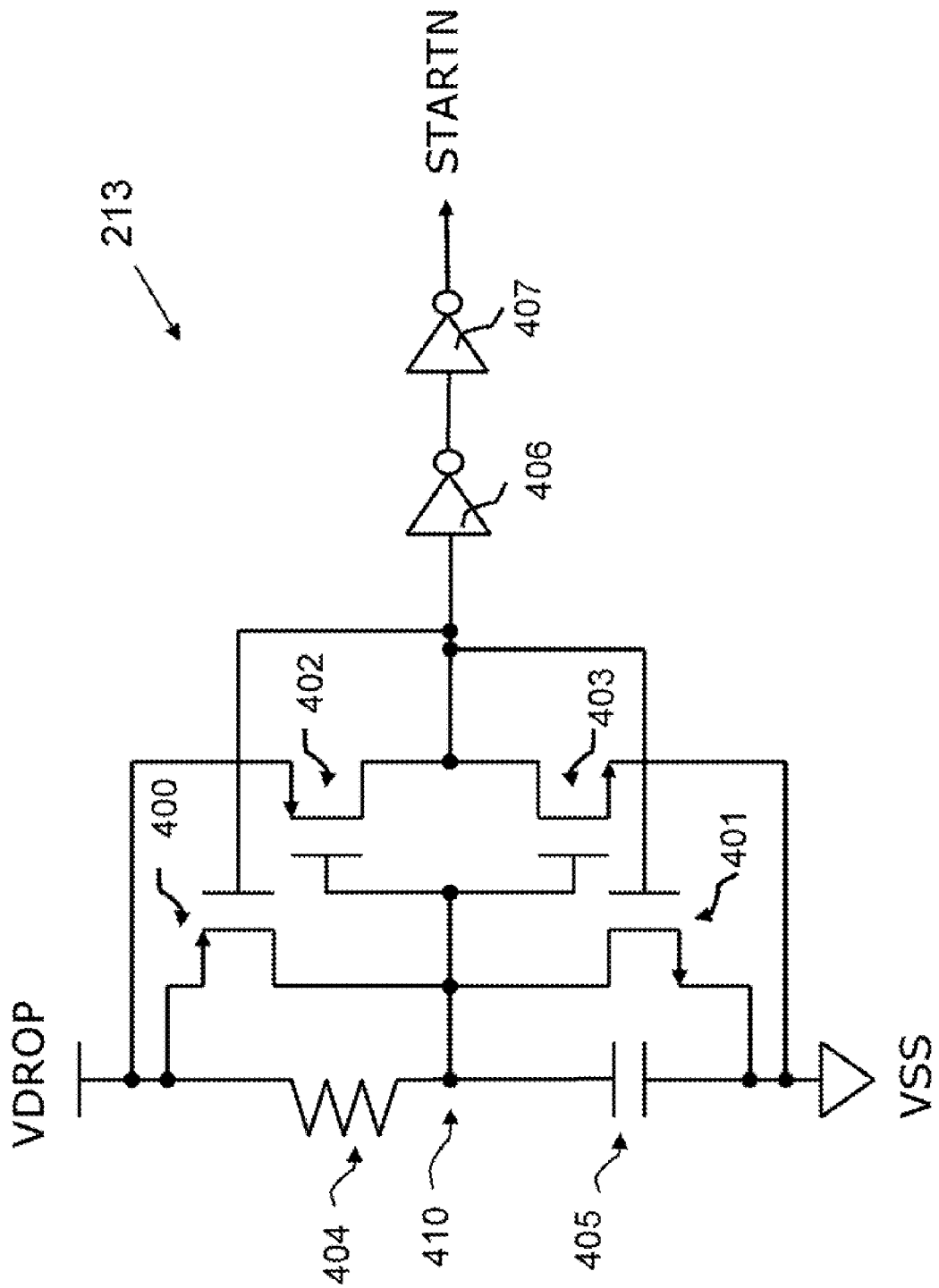
FIG. 4 is a schematic diagram of an implementation of the ESD trigger circuit in FIG. 3.

The ESD trigger circuit 213 receives power form VDROP and can output the control signal STARTN that is specific to a normal operation or an ESD trigger event. An exemplified implementation for the ESD trigger circuit 213 is shown in FIG. 4.

Operations of the ESD protection circuit 30 are now described.

Operations Under Normal Operation Conditions

A normal operation condition refers to the states when the VDD is powered up. During normal operations, STARTN from ESD trigger circuit is at a logic low voltage. The transistors 209 and 210 are turned off. The shunting transistor 209 do not leak a DC current in the source-drain path. In the ESD protection circuit 30, a logic high voltage is approximately VDROP. A logic low is approximately VSS. As a result, the logic high can vary depending on the actual VDROP voltage for difference situations.

VDD is at 3.3V. The IO pad 205 is at about 6.5V, higher than VDD. The drains of the transistors 204 and 206 are both at 6.5V. Assuming $V_{TN}$=1.0V, the voltage at VDROP is 6.5V−2$V_{TN}$=4.5V after two diode drops at the diode-connected transistors 202 and 204. Thus the voltage supply VDROP to the ESD trigger circuit 213 is at 4.5V. Similarly, the voltage at the node 250 is also at 4.5V after two diode drops at the transistors 206 and 208 from the IO pad 205. The transistor 207 is fully turned on and can act as a voltage controlled resistor. The gate-to-drain voltage of the transistor 207 is 6.5V−4.5V=2.0V, below the transistor breakdown voltage. The transistor 207 thus does not breakdown under these voltage conditions. The drain voltage of the transistor 209 or the source voltage of the transistor 207 is at 3.5V (which is the difference between the gate voltage and the turn-on threshold voltage of the transistor 207, that is, $V_G - V_{TN}$=4.5V−1.0V=3.5V), which is also smaller than the maximum transistor operation voltage. The transistor 209 also does not breakdown.

Similarly, when the IO pad 205 is at 6.5V, VDROP and thus the gate of the transistor 201 are at 4.5V. The source of the transistor 201 is at VDROP−$V_{TN}$=4.5V−1.0V=3.5V. The transistor 203 is also shut off by the low-voltage STARTN signal at the gate of the transistor 203 during normal operations. Because the transistor 203 is an NMOS transistor, as long as the gate voltage of the transistor 203 is lower than VDD+$V_{TN}$, the transistor 203 is not turned on. No DC current path is formed between VDROP to VDD even though VDROP (at 4.5V) is higher than VDD (at 3.3V).

The above described configurations can thus provide a safe voltage conditions during normal operations, in which the drain-to-source, gate-to-drain, and gate-to-source voltages in all the transistors in the ESD protection circuit 30 are kept below the transistors' maximum operation voltage. Additionally, the ESD protection circuit 30 does not have DC current leakage during normal operations.

Operations During an ESD Event

ESD events can include ESD zapping from IO pad 205 to VDD and ESD zapping from IO pad 205 to VSS. When an ESD event zaps from the IO pad 205 to VDD, a large amount of charges can accumulate at the IO pad 205. VDROP and the voltage at the node 250 follow closely to voltage at the IO pad 205 and only lower by two diode voltage drops. Once the voltage at the IO pad 205 exceeds 2$V_{TN}$, there are measurable voltages at VDROP and the node 250. When VDROP increases to exceed a threshold (as discussed below, for the implementation shown in FIG. 4, the ESD trigger circuit 213 is turned on, which turns the voltage signal STARTN to logic high. The high voltage at STARTN can turn on the transistors 203, 209 and 210. The threshold voltage is the larger of $|V_{TN}|$ and $|V_{TP}|$. For example, if $|V_{TP}|$=1.2V, $|V_{TN}|$=1.0V, then the threshold is 1.2V. This threshold voltage is the minimum voltage for VDROP that can turn on the transistor 402 or 403.

The electrostatic charges can be discharged in two current paths. One discharge current path is from the IO pad 205 to VSS through transistors 207 and 209 that are both turned on. The other discharge current path is from the IO pad 205 to VDD via transistors 204 to 202 to 203. In practice, however, if VDD is shorted to ground by an external conductive object or a human body, the latter discharge current path becomes the dominant discharge mechanism because VDD has lower impedance node than VSS (which is now floating).

In the event that electrostatic charges zap from the IO pad 205 to VSS, a large amount of electrostatic charges can accumulate at the IO pad 205. VDROP and the voltage at the node 250 follows the voltage of the IO pad 205 and only lower by two diode voltage drops. Once the IO pad voltage exceeds 2$V_{TN}$, measurable voltages appear at VDROP and the node 250. The increase in VDROP can trigger the ESD trigger circuit 213, which turns STARTN to logic high. The high voltage at STARTN can turn on the transistors 203, 209, and 210. The turn-on of the transistor 210 can further turn-on transistor 207. Similar to the previous zapping direction, the electrostatic charges can be discharged two current paths: 1) from the IO pad 205 to VSS through transistors 207 and 209, and 2) from the IO pad 205 to VDD via transistors 204 to 202 to 203. In practice, if VSS is grounded by an external object or a human body, the dominant discharge path is the first path because VSS has lower impedance than the floating VDD.

Although the ESD protection circuit 30 includes two transistor-connected diodes (formed by cascoded transistors) from the IO pad 205 to the node 250 or VDROP, the ESD protection circuit 30 can be compatible with different number of serially connected diodes. The number of diodes in the series can be selected based on the difference between the IO pad voltage and the maximum transistor operation voltage, and the threshold voltage for the diode (or a diode connected transistor). For example, if the IO pad voltage is at 6.5V, the maximum transistor operation voltage is 4.5V, and the diode threshold voltage is 1.0V, two diodes are required (6.5V−4.5V/1.0V=2V). If the IO pad voltage is at 10.0V, the maximum transistor operation voltage is 4.5V, and the diode threshold voltage is 1.0V, six diodes are required (10V−4.5V/1.0V=5.5, which round up to 6) to reduce the voltages across gate-to-drain, gate-to-source and drain-to-source for each transistor in the ESD protection circuit 30 to below the maximum transistor operation voltage.

Referring to FIG. 4, the ESD trigger circuit 213 includes an RC circuit including a resistor 404 and a capacitor 405, a first inverter formed by a PMOS transistor 402 and an NMOS transistor 403, and two feedback transistors 400 and 401 for the first inverter. The output of the inverter is inverted twice by inventers 406 and 407 to produce STARTN. The ESD trigger circuit 213 is connected to VDROP (as the high voltage supply terminal) and VSS. The ESD trigger circuit 213 is activated at or above a threshold voltage. For the implementation shown in FIG. 4, the threshold voltage is the minimum voltage for VDROP that can turn on the transistor 402 or 403. The threshold voltage is the larger of $|V_{TN}|$ and $|V_{TP}|$. For example, if $|V_{TP}|$=1.2V, $|V_{TN}|$=1.0V, then the threshold is 1.2V. During normal operation, the node 410 stays at high voltage (close to VDROP). The output of the first inverter and thus STARTN are at logic low. During an ESD event, the node 410 is pulled to low voltage (close to VSS). The output of the first inverter and thus STARTN are at logic high. Details about operations of ESD trigger circuits are also disclosed in commonly assigned pending U.S. patent application Ser. No. 11/564,052, entitled "Electrostatic discharge protection circuit for output buffer", filed Nov. 28, 2006 (see description about circuit 300).

The disclosed high-voltage protection circuit may include one or more of the following advantages. The disclosed high-voltage protection circuit can withstand high input voltages above VDD. The maximum transistor operation voltage is about 6.0V to 6.5V for 0.35 micron semiconductor technologies and 4.0V to 4.5 Vt for 0.18 micron semiconductor technologies. The disclosed ESD protection circuit allows an electronic circuit to withstand input voltages above the maximum operation voltage for transistors. The disclosed ESD protection circuit can also allow a circuit to withstand ESD events. The disclosed ESD protection circuit can protect a circuit from ESD zapping in different directions such as from an IO pad to VDD, from an IO pad to VSS, or from VDD to VSS.

Moreover, the disclosed ESD protection circuit can have smaller circuit area, can be simpler to design, and can respond to high voltages more quickly than conventional ESD protection circuits. The disclosed ESD protection circuit can utilize only NMOS transistors, which are faster to turn on and have smaller areas than PMOS transistors. The use of NMOS transistors can also prevent DC current leakage from an IO pad to VDD during normal operations, which is a known problem in some conventional ESD protection circuit based on PMOS transistors.

It is understood that the disclosed circuit and methods are compatible with other configurations of the electronic components and variations in circuit designs without deviation from the spirit of the present specification. Various forms of resistors, capacitors, transistors, and amplifiers can be used to achieve similar results as described above. The inverter and the feedback circuits can be based on other logic gate designs that are Boolean equivalents to what is disclosed above. The disclosed ESD protection circuit is applicable to different generations of semiconductor fabrication technologies, and is not limited to the semiconductor fabrication technologies described above (e.g. 0.18 micron and 0.35 micron semiconductor fabrication technologies). The diodes cascoded or connected in series can also be made of bi-polar transistors with their respective terminals are connected as diodes. The serially connected diodes can also include diodes fabricated by p+ diffusion, N-well formation, n+ diffusion, and p-substrate formation. The ESD trigger circuit can include many variations. For example, it can include RC gate coupled circuit layout.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

What is claimed is:

1. An electrostatic discharge protection circuit, comprising:
   a high-voltage supply terminal (VDD);
   an input/output (IO) pad;
   a first shunting transistor configured to discharge electrostatic charges between the IO pad and VDD in response to a control signal;
   a trigger circuit configured to output the control signal in response to an electrostatic voltage between the IO pad and VDD; and
   a first group of serially connected diodes, which includes a first end connected to the IO pad and a second end configured to supply power to the trigger circuit.

2. The electrostatic discharge protection circuit of claim 1, wherein the gate of the first shunting transistor is configured to receive the first control signal.

3. The electrostatic discharge protection circuit of claim 2, wherein the first shunting transistor is turned on to discharge electrostatic charges between the IO pad and VDD when the first control signal has a high logic voltage and the first shunting transistor is turned off when the first control signal has at a low logic voltage.

4. The electrostatic discharge protection circuit of claim 1, wherein the trigger circuit is configured to output the control signal at a high logic voltage in response to an electrostatic voltage between the IO pad and VDD.

5. The electrostatic discharge protection circuit of claim 1, further comprising a second shunting transistor connected between the IO pad and the first shunting transistor, wherein the gate of the second shunting transistor is connected to the second end of the first group of serially connected diodes.

6. The electrostatic discharge protection circuit of claim 1, wherein at least one in the first group of serially connected diodes is a transistor-connected diode.

7. The electrostatic discharge protection circuit of claim 6, wherein the first shunting transistor and the transistor-connected diode are N-MOSFET transistors.

8. The electrostatic discharge protection circuit of claim 1, further comprising:
   a third shunting transistor and a fourth shunting transistor connected in cascoded configuration between the IO pad and a low-voltage supply terminal (VSS), wherein a gate of the fourth shunting transistor is connected to the control signal output by the trigger circuit; and a second group of serially connected diodes, which includes a first end connected to the IO pad and a second end configured to gate of the third shunting transistor.

9. The electrostatic discharge protection circuit of claim 8, further comprising a resistor connecting the gate of the fourth shunting transistor and VSS.

10. The electrostatic discharge protection circuit of claim 1, wherein the trigger circuit comprises:
   a first inverter;
   a first feedback transistor having a gate connected with the output of the first inverter and a drain connected with the input of the first inverter; and
   a second feedback transistor having a gate connected with the output of the first inverter and a source connected with the input of the first inverter.

11. The electrostatic discharge protection circuit of claim 10, wherein the trigger circuit further comprises a resistor and a capacitor that are connected to an input to the first inverter, wherein at least one of the resistor and the capacitor is connected with the voltage supply terminal.

12. An electrostatic discharge protection circuit, comprising:
   a high-voltage supply terminal (VDD);
   an input/output (IO) pad;
   a first shunting transistor configured to discharge electrostatic charges between the IO pad and VDD in response to a control signal received by the gate of the first shunting transistor;
   a trigger circuit configured to output the control signal in response to an electrostatic voltage between the IO pad and VDD;
   a first group of serially connected diodes, which includes a first end connected to the IO pad and a second end configured to supply power to the trigger circuit;
   a second shunting transistor and a third shunting transistor connected in cascoded configuration between the IO pad and a low-voltage supply terminal (VSS), wherein a gate of the fourth shunting transistor is connected to the control signal output by the trigger circuit; and
   a second group of serially connected diodes, which includes a first end connected to the IO pad and a second end configured to gate of the third shunting transistor.

13. The electrostatic discharge protection circuit of claim 12, wherein the trigger circuit is configured to output the control signal at a high logic voltage in response to an electrostatic voltage between the IO pad and VDD.

14. The electrostatic discharge protection circuit of claim 12, further comprising a fourth shunting transistor connected between the IO pad and the first shunting transistor, wherein the gate of the second shunting transistor is connected to the second end of the first group of serially connected diodes.

15. The electrostatic discharge protection circuit of claim 12, wherein at least one in the first group of serially connected diodes or the second group of serially connected diodes is a transistor-connected diode.

16. The electrostatic discharge protection circuit of claim 12, wherein the first shunting transistor, the second shunting transistor, and the third shunting transistor are N-MOSFET transistors.

17. The electrostatic discharge protection circuit of claim 12, further comprising a resistor connecting the gate of the fourth shunting transistor and VSS.

18. An electrostatic discharge protection circuit, comprising:
   a high-voltage supply terminal (VDD);
   an input/output (IO) pad;
   a first shunting transistor and a second shunting transistor connected in cascoded configuration between the IO pad and VDD, wherein the first shunting transistor and the second shunting transistor are configured to discharge electrostatic charges between the IO pad and VDD in response to a control signal received by the gate of the first shunting transistor;
   a trigger circuit configured to output the control signal in response to an electrostatic voltage between the IO pad and VDD;
   a first group of serially connected diodes, which includes a first end connected to the IO pad and a second end configured to supply power to the trigger circuit, wherein the second end of the first group of serially connected diodes is connected to the gate of the second shunting transistor;
   a third shunting transistor and a fourth shunting transistor connected in cascoded configuration between the IO pad and a low-voltage supply terminal (VSS), wherein a gate of the fourth shunting transistor is connected to the control signal output by the trigger circuit; and
   a second group of serially connected diodes, which includes a first end connected to the IO pad and a second end configured to gate of the third shunting transistor.

19. The electrostatic discharge protection circuit of claim 18, wherein the trigger circuit is configured to output the control signal at a high logic voltage in response to an electrostatic voltage between the IO pad and VDD.

20. The electrostatic discharge protection circuit of claim 18, wherein at least one in the first group of serially connected diodes or the second group of serially connected diodes is a transistor-connected diode.

* * * * *